United States Patent
Ogasawara

(10) Patent No.: US 11,173,394 B2
(45) Date of Patent: Nov. 16, 2021

(54) INFORMATION PROCESSING APPARATUS AND NORMAL LINE INFORMATION ACQUISITION METHOD

(71) Applicant: SONY INTERACTIVE ENTERTAINMENT INC., Tokyo (JP)

(72) Inventor: Hidehiko Ogasawara, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 16/606,548

(22) PCT Filed: May 18, 2017

(86) PCT No.: PCT/JP2017/018659
§ 371 (c)(1),
(2) Date: Oct. 18, 2019

(87) PCT Pub. No.: WO2018/211654
PCT Pub. Date: Nov. 22, 2018

(65) Prior Publication Data
US 2020/0094140 A1    Mar. 26, 2020

(51) Int. Cl.
*A63F 13/42* (2014.01)
*G06T 7/11* (2017.01)
(Continued)

(52) U.S. Cl.
CPC .......... *A63F 13/42* (2014.09); *A63F 13/213* (2014.09); *G06F 3/011* (2013.01); *G06T 7/11* (2017.01);
(Continued)

(58) Field of Classification Search
CPC ...... A63F 13/42; A63F 13/213; A63F 13/211; A63F 13/212; A63F 13/25; A63F 13/428;
(Continued)

(56) References Cited

U.S. PATENT DOCUMENTS 6,329,988 B1 * 12/2001 Watanabe ............. G06T 15/506
345/426
9,064,764 B2   6/2015 Ozawa et al.
(Continued)

FOREIGN PATENT DOCUMENTS

EP      0999518 A1    5/2000
JP    2005159888 A    6/2005
(Continued)

OTHER PUBLICATIONS

International Search Report and Written Opinion dated Aug. 15, 2017, from International Application No. PCT/JP2017/018659, 10 sheets.
(Continued)

*Primary Examiner* — Tung T Vo
(74) *Attorney, Agent, or Firm* — Katten Muchin Rosenman LLP

(57) ABSTRACT

A captured image acquisition section 50 acquires from an imaging apparatus 12 data of a polarized image captured of a target object and stores the image data into an image data storage section 52. A region division section 58 in a normal line information acquisition section 54 divides a plane of the image into regions according to a predetermined criterion such as a polarization degree or luminance. A normal line calculation section 60 obtains a distribution of normal lines of each region by applying either a specular reflection model or a diffuse reflection model thereto. An integration section 62 integrates the distributions of normal lines of the regions into a normal line distribution of the entire image. An output data generation section 56 performs information processing using the normal line distribution and outputs the result of the processing.

7 Claims, 13 Drawing Sheets

(51) Int. Cl.
*H04N 5/235* (2006.01)
*A63F 13/213* (2014.01)
*G06T 7/73* (2017.01)
*G06F 3/01* (2006.01)
*G02B 5/30* (2006.01)

(52) U.S. Cl.
CPC ............ *G06T 7/73* (2017.01); *H04N 5/2354* (2013.01); *G02B 5/3058* (2013.01); *G06T 2207/10152* (2013.01); *G06T 2207/30196* (2013.01)

(58) Field of Classification Search
CPC ........ A63F 13/5255; A63F 13/65; G06T 7/11; G06T 7/73; G06T 2207/10152; G06T 2207/30196; G06T 7/529; G06F 3/011; H04N 5/2354; H04N 5/2254; H04N 5/23293; H04N 5/23229; G02B 5/3058; G01B 11/26; G06K 9/2036; G06K 9/2027; G06K 9/4661; G06K 9/00201
USPC ........................................................ 348/135
See application file for complete search history.

(56) References Cited

U.S. PATENT DOCUMENTS

| | | | |
|---|---|---|---|
| 2005/0254378 A1 | 11/2005 | Wagner et al. | |
| 2009/0135183 A1* | 5/2009 | Sato | G01B 11/002 345/426 |
| 2009/0279807 A1* | 11/2009 | Kanamori | G02B 5/3025 382/274 |
| 2010/0283883 A1* | 11/2010 | Sato | G02B 27/283 348/335 |
| 2010/0289878 A1* | 11/2010 | Sato | H04N 13/239 348/46 |
| 2011/0262007 A1* | 10/2011 | Kojima | G01N 21/8806 382/103 |
| 2012/0086950 A1* | 4/2012 | Sho | G01B 11/2509 356/601 |
| 2013/0141569 A1 | 6/2013 | Ikeda | |
| 2014/0327902 A1* | 11/2014 | Giger | G01S 7/4814 356/5.01 |
| 2016/0210754 A1 | 7/2016 | Ida et al. | |

FOREIGN PATENT DOCUMENTS

| | | |
|---|---|---|
| JP | 2009-058533 A | 3/2009 |
| JP | 4435867 B2 | 3/2010 |
| JP | 2012-080065 | 4/2012 |
| JP | 2013-120093 | 6/2013 |
| JP | 2016-133396 A | 7/2016 |
| JP | 2017-016431 A | 1/2017 |

OTHER PUBLICATIONS

Gary Atkinson and Edwin R. Hancock, "Recovery of Surface Orientation from Diffuse Polarization," IEEE Transactions on Image Processing, Jun. 2006, 15(6), pp. 1653-1664.
International Preliminary Report on Patentability dated Nov. 14, 2019, from International Application No. PCT/JP2017/018659, 16 sheets.

* cited by examiner

FIG.8
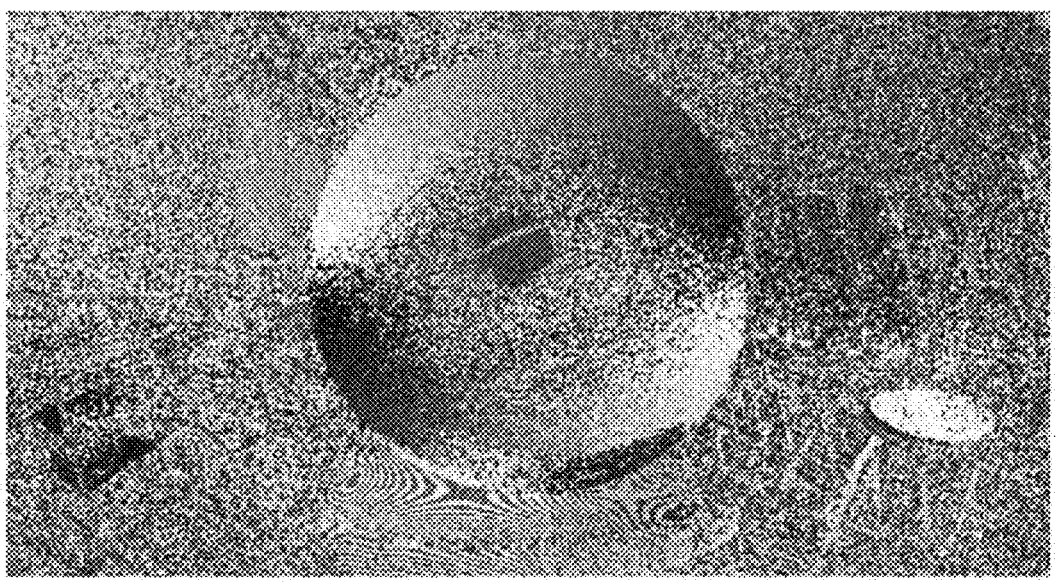
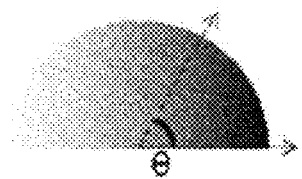

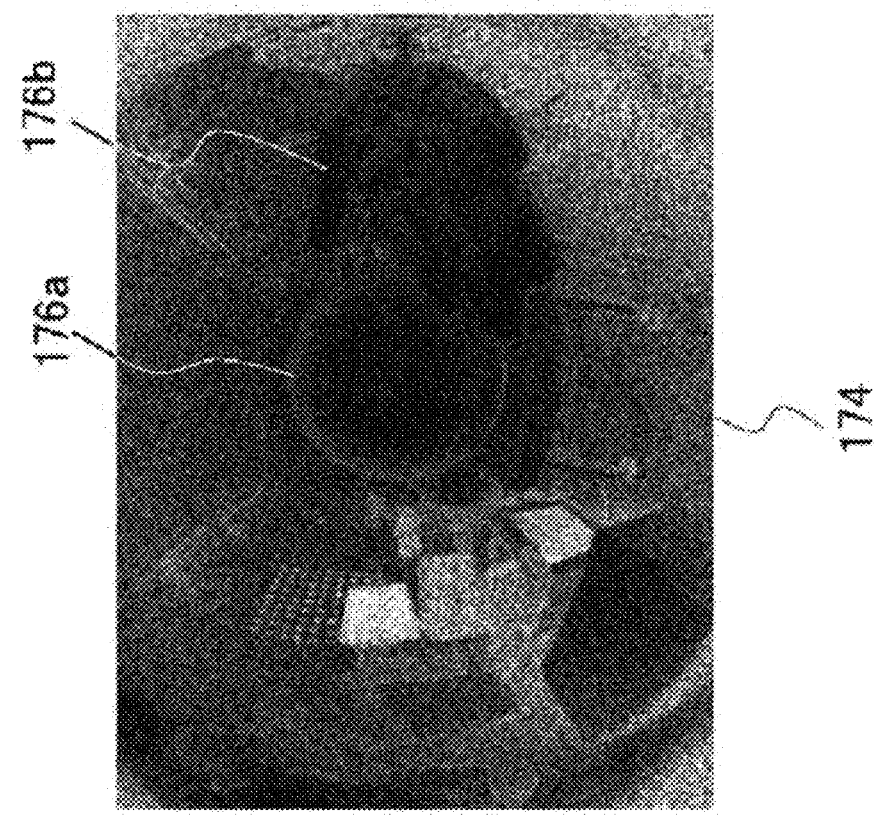
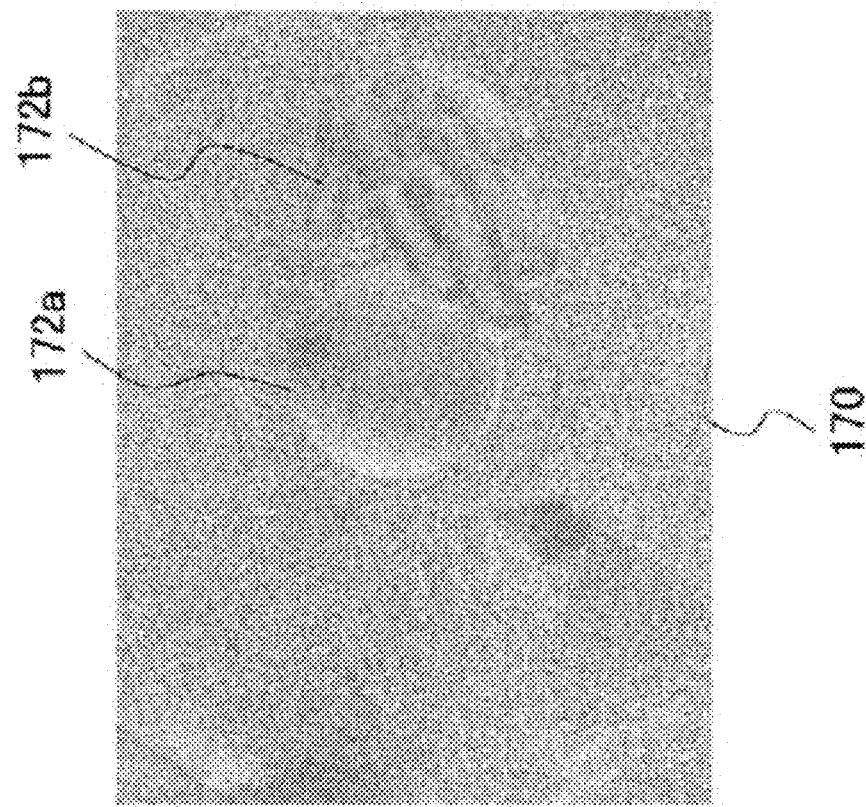
FIG. 14

INFORMATION PROCESSING APPARATUS AND NORMAL LINE INFORMATION ACQUISITION METHOD

TECHNICAL FIELD

The present invention relates to an information processing apparatus and a target object recognition method for recognizing the state of a target object using captured images.

BACKGROUND ART

Games have been known which involve capturing part of a human body such as a user's head with a video camera, extracting predetermined regions from the captured image such as the eyes, mouth and hands, and replacing the extracted regions with other images to form a display image for use in gaming (e.g., see PLT 1). Also known are user interfaces for accepting the motions of the user's mouth and hands captured by a video camera as operating instructions for applications. These techniques for capturing the real world and displaying a virtual world reacting to the captured motions in the real world or using the captured motions in some types of information processing have been employed in extensive fields regardless of scale ranging from small mobile terminals to leisure facilities.

CITATION LIST

Patent Literature

[PTL 1]
European Published Patent No. EP0999518 A1

SUMMARY

Technical Problems

One problem with image analysis that involves acquiring the position and posture of a target object from a captured image is that the accuracy of processing tends to be unstable due to the appearance, position, and imaging environment of the target object. For example, common techniques that use feature points in extracting an image of the target object from the captured image or doing matching between the images are intrinsically subject to worsening accuracy of processing attributable to too few feature points of the target object or a too small apparent size of the target object located far away from the camera. The more robust the accuracy of processing is desired to be, the heavier the processing load involved due to ever-finer spatial and temporal granularity or more complex algorithms.

The present invention has been made in view of the above circumstances. An object of the invention is therefore to provide techniques for acquiring the state of the target object efficiently and accurately using captured images.

Solution to Problems

According to one embodiment of the present invention, an information processing apparatus is provided. The information processing apparatus acquires information regarding a normal line of a surface of an object from a polarized image thereof for information processing. The information processing apparatus includes: a region division section configured to divide an image plane into a plurality of regions so as to assign either a specular reflection model or a diffuse reflection model to each of the regions; a normal line calculation section configured to obtain a distribution of normal lines of each of the regions divided of the polarized image through application of the assigned model; and an integration section configured to integrate the distributions of normal lines of the regions so as to generate and output a normal line distribution of the entire image plane.

According to another embodiment of the present invention, a normal line information acquisition method is provided. The normal line information acquisition method is by an information processing apparatus for acquiring information regarding a normal line of a surface of an object from a polarized image thereof. The method includes the steps of: dividing an image plane into a plurality of regions so as to assign either a specular reflection model or a diffuse reflection model to each of the regions; obtaining a distribution of normal lines of each of the regions divided of the polarized image through application of the assigned model; and integrating the distributions of normal lines of the regions so as to generate and output a normal line distribution of the entire image plane.

Incidentally, if other combinations of the above-outlined composing elements or the above expressions of the present invention are converted between different forms such as a method and an apparatus, they still constitute effective embodiments of this invention.

Advantageous Effect of Invention

According to the present invention, the state of the target object is acquired efficiently and accurately using captured images.

BRIEF DESCRIPTION OF DRAWINGS

FIG. 8 is a schematic diagram depicting an azimuth image corresponding to a normal line image in FIG. 7.

FIG. 14 is a schematic diagram illustrating various images given where there are diffusers in a target space according to the present embodiment.

DESCRIPTION OF EMBODIMENT

Figure 1:
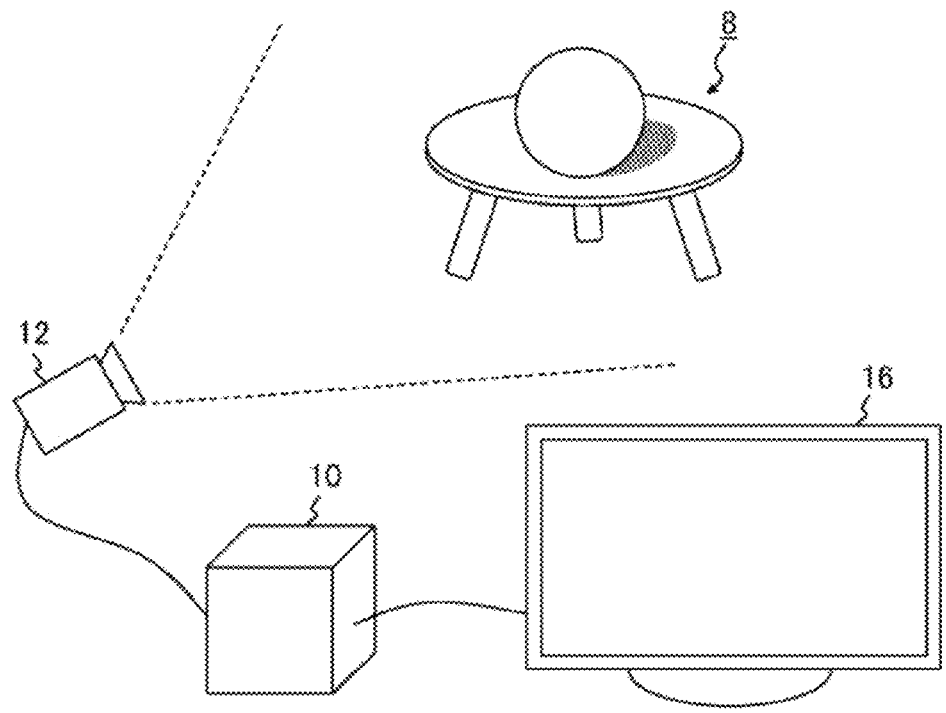
FIG. 1 is a schematic diagram depicting a configuration example of an information processing system according to the present embodiment.

FIG. 1 depicts a configuration example of an information processing system according to the present embodiment. The information processing system includes an imaging apparatus 12 for capturing an image of an object 8 at a predetermined frame rate, an information processing apparatus 10 for acquiring the data of the captured image and performing predetermined information processing, and a display apparatus 16 for outputting the result of the information processing. The information processing system may also include an input apparatus for accepting operations performed by a user on the information processing apparatus 10. The information processing apparatus 10 may further be configured to be communicable with an external apparatus such as a server by connecting with networks such as the Internet.

The information processing apparatus 10, imaging apparatus 12, and display apparatus 16 may be interconnected either by cable or in a wireless manner such as via a local area network (LAN). At least two of the information processing apparatus 10, imaging apparatus 12, and display apparatus 16 may be combined to form an integral apparatus. For example, these apparatuses may be mounted on a camera or a mobile terminal to implement an information processing system. Alternatively, the display apparatus 16 may be configured as a head-mounted display that, when worn by the user, projects images in front of the user's eyes. The head-mounted display may be equipped with the imaging apparatus 12 to capture images corresponding to the user's line of sight. In any case, the appearances of the information processing apparatus 10, imaging apparatus 12, and display apparatus 16 are not limited to those illustrated in the drawing.

In the above-described system, the information processing apparatus 10 successively acquires and analyzes the data of images captured by the imaging apparatus 12 at a predetermined frame rate, thereby obtaining a distribution of normal lines on a surface of the object 8. On the basis of the normal line distribution, the information processing apparatus 10 acquires state information such as the position, posture, and shape of the object. The information processing apparatus 10 further performs information processing in a manner reflecting the acquired state information to generate display image data and audio data, before outputting the generated data to the display apparatus 16. Here, the state information of the object 8 acquired by the information processing apparatus 10 based on the normal line distribution and the content of the information processing carried out accordingly are not limited to anything specific.

For example, a predetermined target object included in the object 8 may be configured as a game controller to be gripped and moved by the user to perform operations on an ongoing game. In this case, the image representing the game world may be changed in accordance with the motion of the controller, or an image captured of the user in which the controller is replaced with a virtual object may be displayed. In another example, the head-mounted display may be configured to display an image representing a virtual object that interacts with the user's hand in a field of view corresponding to the line of sight of the user wearing the head-mounted display.

As described above, there are diverse manners in which information processing is carried out using the normal line distribution. In the description that follows, the emphasis is on the techniques for identifying efficiently and accurately the normal line distribution of the object 8 from the captured image. In achieving this purpose, the imaging apparatus 12 according to the present embodiment captures at least a polarized image of the target space.

Figure 2:
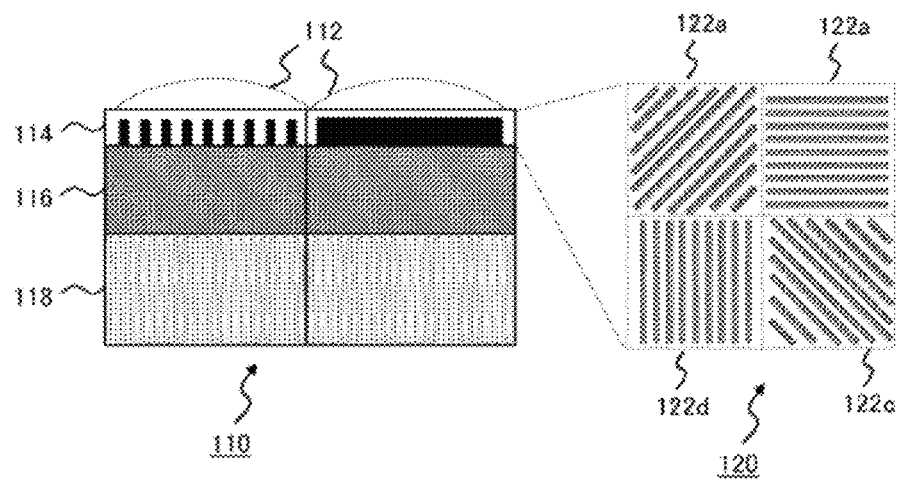
FIG. 2 is a schematic diagram depicting a structure example of an imaging device included in an imaging apparatus according to the present embodiment.

FIG. 2 depicts a structure example of an imaging device as part of the imaging apparatus 12. This drawing schematically depicts a cross-sectional functional structure of the imaging device and omits its detailed structure such as interlayer insulating films and wiring. The imaging device 110 includes a microlens layer 112, a wire grid type polarizer layer 114, a color filter layer 116, and a light detection layer 118. The wire grid type polarizer layer 114 includes polarizers each including multiple linear conductive members arranged in stripes at intervals of a distance shorter than the wavelength of incident light. When the light condensed by the microlens layer 112 enters the wire grid type polarizer layer 114, the polarization components oriented in parallel with the polarizer lines are reflected, with only the polarization components normal thereto being transmitted therethrough.

A polarized image is acquired by the light detection layer 118 detecting the transmitted polarization components. The light detection layer 118 has a semiconductor device structure similar to that of a common charge-coupled device (CCD) image sensor or that of a complementary metal oxide semiconductor (CMOS) image sensor. The wire grid type polarizer layer 114 includes an array of polarizers of which the principal axis angles vary in charge read units, i.e., in units of pixels or in larger units, in the light detection layer 118. The right side of FIG. 2 depicts a polarizer array 120 as viewed from the top side of the wire grid type polarizer layer 114.

In FIG. 2, the hatched lines represent conductors (wires) configuring the polarizers. The squares delimited by broken lines each denote a region of polarizers having a single principal axis angle. It is to be noted that the broken lines are not actually formed. In the illustrated example, the polarizers with four principal axis angles are arranged in four regions 122a, 122b, 122c, and 122d, in two rows and two columns. In the drawing, the polarizers diagonally positioned to each other have their principal axis angles set perpendicular to each other. The adjacent polarizers have a difference of 45° therebetween. That is, the polarizers are provided with four principal axis angles at intervals of 45°.

Each polarizer transmits the polarization component perpendicular to the wire direction. The light detection layer 118 under the polarizers has four layer regions corresponding to the four polarizer regions 122a, 122b, 122c, and 122d, the four layer regions acquiring polarization information in four directions at intervals of 45°. A predetermined number of the arrays of such polarizers with four principal axis angles are arranged vertically and horizontally and connected with peripheral circuits that control the timing of charge read operations. The arrangement implements an image sensor that obtains simultaneously four kinds of polarization information as two-dimensional data.

The imaging device 110 in FIG. 2 has the color filter layer 116 interposed between the wire grid type polarizer layer 114 and the light detection layer 118. The color filter layer 116 includes arrays of filters that separately transmit red light, green light, and blue light corresponding to the pixels involved, for example. The filter arrays provide polarization information separately by color according to the combination of the principal axis angles of the polarizers in the wire grid type polarizer layer 114 above and the colors of the filters in the color filter layer 116 below. That is, polarization information regarding the same color in the same direction is obtained discretely on an image plane. The information thus obtained is interpolated as needed to provide a polarized image in each color in each direction.

It is also possible to operate on the polarized images in the same color to reproduce a non-polarized color image. The techniques for image acquisition using wire grid type polarizers are disclosed, for example, in Japanese Patent Laid-open No. 2012-80065. It is to be noted, however, that the device structure of the imaging apparatus 12 according to the present embodiment is not limited to what is illustrated. For example, whereas the embodiment basically uses polarized luminance images, the color filter layer 116 may be omitted for other purposes where color images are not required. The polarizers are not limited to the wire grid type and may be some other commercially available polarizers such as linear dichroic polarizers. In another structure example, polarization plates with variable principal axis angles may be disposed in front of a common camera.

The behavior of polarization intensity with respect to direction is dependent on the angle of reflection of light from the object. Taking advantage of this fact, there exists a commonly known technique for obtaining a normal line on the object surface on the basis of luminance changes in a polarized image with regard to angular changes of polarizers (e.g., see Gary Atkinson and Edwin R. Hancock, "Recovery of Surface Orientation from Diffuse Polarization," IEEE Transactions on Image Processing, June 2006, 15(6), pp. 1653-1664, Japanese Patent Laid-open No. 2009-58533, etc.). This technique may be applied in conjunction with the present embodiment. What follows is an outline of this technique.

First, the luminance of the light observed via polarizers varies with respect to their principal axis angle $\theta_{pol}$ as defined by the following mathematical expression:

[Math. 1]

$$I = \frac{I_{max} + I_{min}}{2} + \frac{I_{max} - I_{min}}{2} \cos(2(\theta_{pol} - \phi)) \quad \text{(Exp. 1)}$$

In the above expression, $I_{max}$ and $I_{min}$ denote a maximum value and a minimum value of the observed luminance, respectively, and $\phi$ represents polarization phase. As discussed above, when polarized images are obtained with respect to four principal axis angles $\theta_{pol}$, the luminance I of the pixels in the same position satisfies the mathematical expression 1 above with regard to each principal axis angle $\theta_{pol}$. Thus, the values $I_{max}$, $I_{min}$, and $\phi$ are obtained by approximating a curve passing through these coordinates (I, $\theta_{pol}$) by a cosine function using the least square method, for example. Given the values $I_{max}$ and $I_{min}$ thus acquired, a polarization degree $\rho$ is obtained by the following mathematical expression:

[Math. 2]

$$\rho = \frac{I_{max} - I_{min}}{I_{max} + I_{min}} \quad \text{(Exp. 2)}$$

A normal line on the surface of a target object is expressed by an azimuth angle $\alpha$ representing the angle of a light incident plane (an emission plane in the case of diffuse reflection) and by a zenith angle $\theta$ denoting the angle on that plane. According to the dichroic reflection model, the spectrum of reflected light is expressed by a linear sum of the spectrum of specular reflection and that of diffuse reflection. Here, specular reflection refers to the regularly reflected light from the surface of an object, and diffuse reflection refers to the light diffused by pigment particles as part of the object. The above-mentioned azimuth angle $\alpha$ is the principal axis angle at which the mathematical expression 1 above gives the minimum luminance $I_{min}$ in the case of specular reflection or at which the mathematical expression 1 above gives the minimum luminance $I_{max}$ in the case of diffuse reflection.

The zenith angle $\theta$ is related to the polarization degree $\rho_s$ in the case of specular reflection and to the polarization degree $\rho_d$ in the case of diffuse reflection as follows:

[Math. 3]

$$\rho_s = \frac{2\sin^2\theta\cos\theta\sqrt{n^2 - \sin^2\theta}}{n^2 - \sin^2\theta - n^2\sin^2\theta + 2\sin^4\theta} \quad \text{(Exp. 3)}$$

$$\rho_d = \frac{(n - 1/n)^2\sin^2\theta}{2 + 2n^2 - (n + 1/n)^2\sin^2\theta + 4\cos\theta\sqrt{n^2 - \sin^2\theta}}$$

In the mathematical expression 3 above, n represents the refractive index of the object. The zenith angle $\theta$ is obtained by substituting the polarization degree $\rho$ acquired with the expression 2 above into either $\rho_s$ or $\rho_d$ in the expression 3. Given the azimuth angle $\alpha$ and the zenith angle $\theta$ thus obtained, a normal vector $(p_x, p_y, p_z)$ is acquired as follows:

[Math. 4]

$$\begin{pmatrix} p_x \\ p_y \\ p_z \end{pmatrix} = \begin{pmatrix} \cos\alpha\cos\theta \\ \sin\alpha\cos\theta \\ \sin\theta \end{pmatrix} \quad \text{(Exp. 4)}$$

In this manner, given the relations between the luminance I represented by each pixel of the polarized images on one hand and the principal axis angle $\theta_{pol}$, of the polarizers on the other hand, the normal vector of the target object reflected by each pixel is obtained. A normal vector distribution is thus acquired for the entire image. It is to be noted, as discussed above, that the observed light includes the specular reflection component and the diffuse reflection component. The different reflection components require different techniques for calculating the normal vector. Also, the ratio of the specular reflection component and the diffuse reflection component included in the reflected light varies with the color and material of the object surface. The varying ratio in turn changes the relations between polarization characteristics on one hand and normal lines of the object on the other hand.

For that reason, diverse techniques have been studied for separating the observed polarized light into the specular reflection component and the diffuse reflection component for evaluation. However, the studies have run into a number of problems in terms of accuracy and processing load. With this embodiment, the image plane is suitably divided into regions so that either the specular reflection model or the diffuse reflection model is applied to each of the regions. In this manner, highly accurate normal line information is obtained easily without separating the components.

Figure 3:
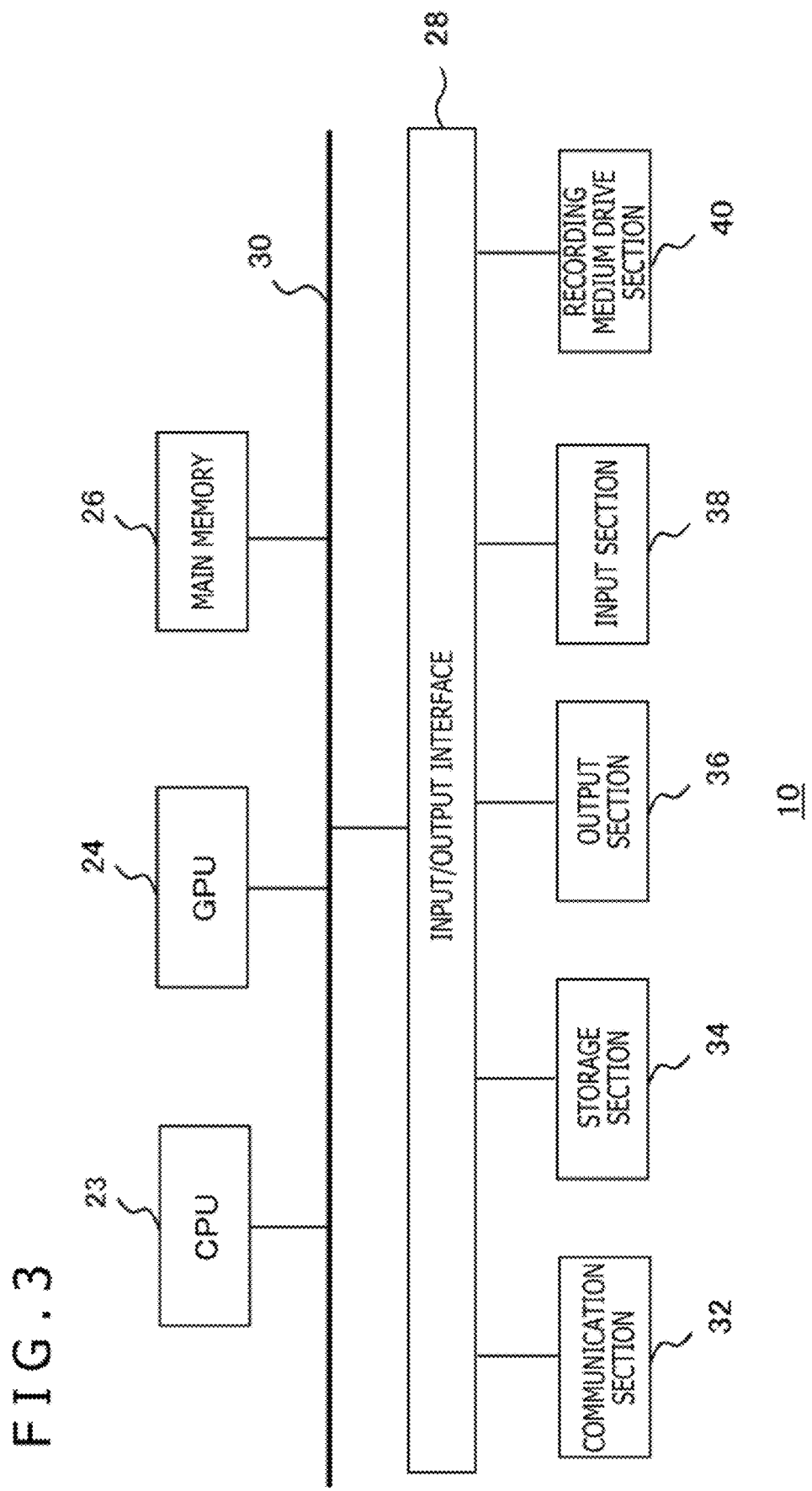
FIG. 3 is a schematic diagram depicting an internal circuit configuration of an information processing apparatus according to the present embodiment.

FIG. 3 depicts an internal circuit configuration of the information processing apparatus 10. The information processing apparatus 10 includes a central processing unit (CPU) 23, a graphics processing unit (GPU) 24, and a main memory 26. These parts are interconnected via a bus 30. The bus 30 is further connected with an input/output interface 28. The input/output interface 28 is connected with peripheral interfaces such as universal serial bus (USB) and IEEE 1394 ports, a communication section 32 including a wired or wireless LAN network interface, a storage section 34 such as a hard disk drive or a nonvolatile memory, an output section 36 for outputting data to the display apparatus 16, an input section 38 for receiving input of data from the imaging apparatus 12 or from an input apparatus, not depicted, and a recording medium drive section 40 for driving a removable recording medium such as a magnetic disk, an optical disk, or a semiconductor memory.

The CPU 23 controls the entire information processing apparatus 10 by executing an operating system held in the storage section 34. The CPU 23 further executes programs that are loaded into the main memory 26 after being read from the removable recording medium or downloaded via the communication section 32. The GPU 24 with its functions of a geometry engine and a rendering processor performs rendering processes in response to rendering commands from the CPU 23, and stores display image data into a frame buffer, not depicted. The GPU 24 further converts the display image stored in the frame buffer into a video signal for output to the output section 36. The main memory 26 including a random access memory (RAM) stores the programs and data necessary for the processing.

Figure 4:
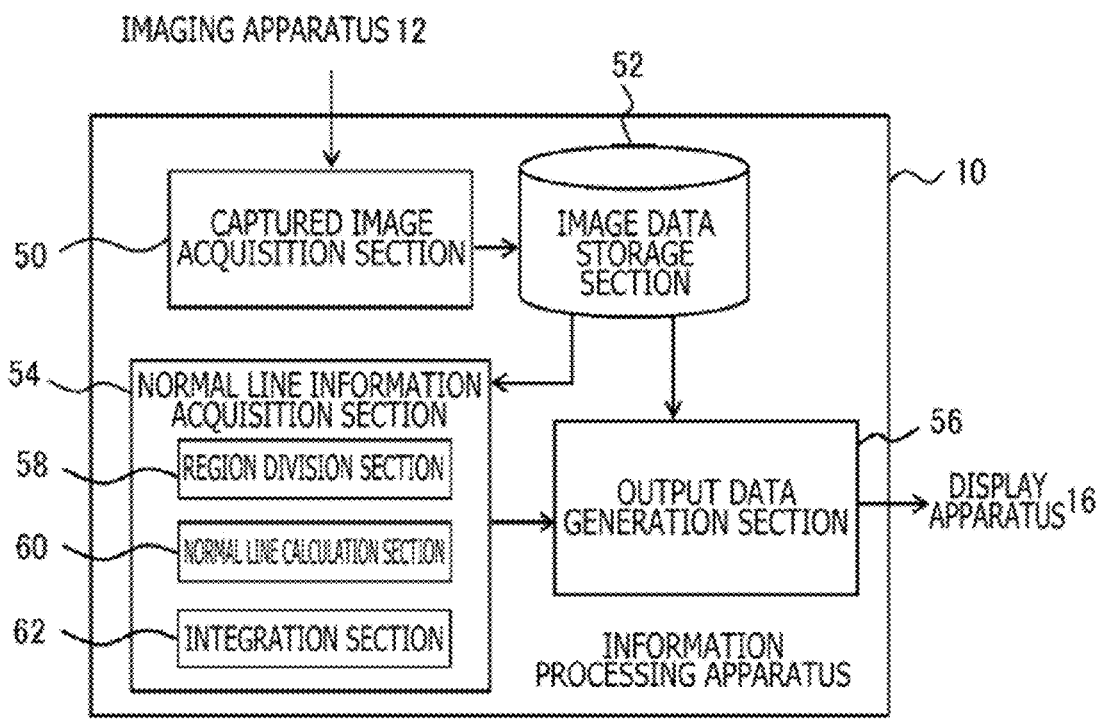
FIG. 4 is a schematic diagram depicting a functional block configuration of the information processing apparatus according to the present embodiment.

FIG. 4 depicts a functional block configuration of the information processing apparatus 10 according to the present embodiment. The functional blocks depicted in FIG. 4 may be configured by hardware using the CPU, GPU, memories, and data bus illustrated in FIG. 3, for example, or by software using programs that are typically loaded from recording media into memory to implement such functions as data input, data retention, calculation, image processing, and communication. It will thus be appreciated by those skilled in the art that these functional blocks are implemented by hardware only, by software only, or by a combination thereof in diverse forms and are not limited to any one of such forms.

The information processing apparatus 10 includes a captured image acquisition section 50 that acquires the data of captured images from the imaging apparatus 12, an image data storage section 52 that stores the acquired image data, a normal line information acquisition section 54 that acquires normal line information regarding the object from captured images, and an output data generation section 56 that generates data to be output by performing information processing on the basis of the normal line information.

The captured image acquisition section 50 is implemented using the input section 38 and the CPU 23 in FIG. 3, for example. The captured image acquisition section 50 acquires the data of captured images such as polarized images from the imaging apparatus 12 at a predetermined rate. In order to obtain the normal line information regarding the object in the manner discussed above, the captured image acquisition section 50 acquires at least the data of polarized images. Depending on the content of information processing performed by the information processing apparatus 10 or on the image to be displayed, the captured image acquisition section 50 may further acquire non-polarized (natural light) image data. The image data storage section 52 is implemented using the main memory 26. The image data storage section 52 successively stores the captured image data acquired by the captured image acquisition section 50. At this point, the captured image acquisition section 50 may, as needed, generate and store image data required for subsequent processes such as a luminance image generated from a color image.

The normal line information acquisition section 54 is implemented using the CPU 23 and the GPU 24, for example. The normal line information acquisition section 54 acquires, at a predetermined rate, the normal line information regarding the object surface in a target space by use of the polarized image data stored in the image data storage section 52. More specifically, the normal line information acquisition section 54 includes a region division section 58, a normal line calculation section 60, and an integration section 62. The region division section 58 divides a polarized image plane according to predetermined criteria. Qualitatively, the region division section 58 extracts the region of which accurate normal lines are obtained by application thereto of the diffuse reflection model through the use of indirect parameters such as polarization degree and luminance.

The extracted region is thus considered the region to which the diffuse reflection model is to be applied. The remaining region is considered the region to which the specular reflection model is to be applied. Generally, as compared with the diffusely reflected light having undergone absorption and scattering by the object surface, the specular reflection component not undergoing such processes has higher intensity when observed in the polarized image. Thus, in the case where the same model is to be applied to the entire image, accurate normal lines are more likely to be obtained by applying the specular reflection model thereto.

Meanwhile, the inventors of this invention have found that there are definitely cases where applying the diffuse reflection model to a given region leads to higher accuracy depending on the position of illumination (light source) and on the material of the object. When that region is separated from the remaining region depending on the circumstances, with the diffuse reflection model applied to the former region and the specular reflection model to the latter region, the normal line information is acquired highly accurately regardless of the illumination or the material involved. A specific example in which the applicable region is identified using polarization degree and luminance will be discussed later.

The normal line calculation section 60 calculates as described above the normal line information regarding the object surface appearing as an image by applying either the diffuse reflection model or the specular reflection model to each of the regions divided of the image. When a normal vector is obtained for each pixel or for a pixel block formed by multiple pixels, a distribution of normal vectors is acquired for each of the regions. The integration section 62 then integrates such normal vector distributions calculated by use of the different model for each region, thereby acquiring the data of a single normal vector distribution.

The output data generation section 56 is implemented using the CPU 23, the GPU 24, and the output section 36, for example. The output data generation section 56 generates the data to be output such as display image data and audio data by performing predetermined information processing on the basis of the normal line information acquired by the normal line information acquisition section 54. The content of the information processing performed here is not limited to anything specific as mentioned above. For example, in the case where a virtual object is to be rendered in a manner contacting the target object in the captured image, the output data generation section 56 reads the data of a captured color image from the image data storage section 52 to render the virtual object in a manner reflecting the surface state of the target object.

In any case, the output data generation section 56 acquires information necessary for information processing such as the position, posture, and tilt of the target object included in the imaged object on the basis of the normal line information acquired by the normal line information acquisition section 54. Incidentally, the output data generation section 56 may acquire the state of the target object using some other means such as acquisition of the distance to the target object from right and left stereoscopic images that have a parallax therebetween and are captured by a stereo camera as part of the imaging apparatus 12, the acquired distance being used in a complementary manner with the normal line information for acquisition of the target object state with higher accuracy. The output data generation section 56 outputs the output data such as the display image thus generated to the display apparatus 16.

Figure 5:
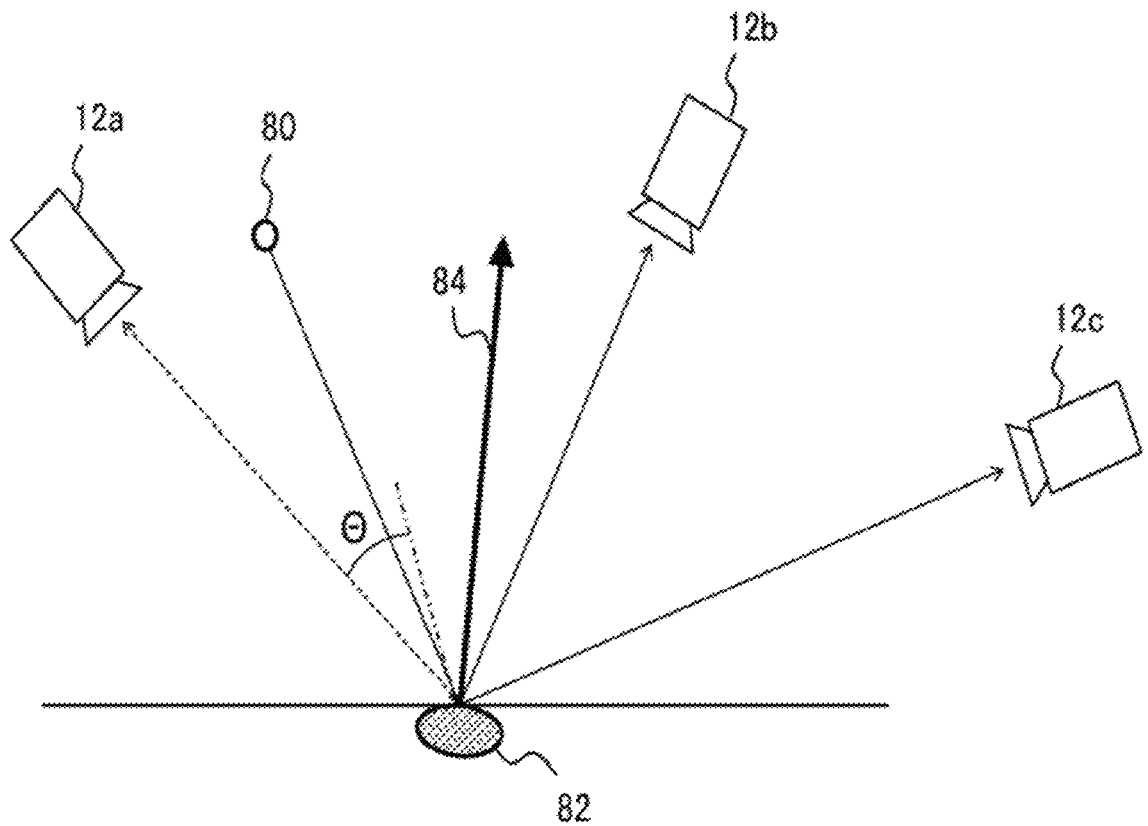
FIG. 5 is a schematic diagram explaining an example in which application of a diffuse reflection model works effectively according to the present embodiment.

FIG. 5 is a schematic diagram explaining an example in which application of the diffuse reflection model works effectively. Consider a case where light from an object surface 82 is captured by imaging apparatuses 12a, 12b, and 12c at three positions as depicted in FIG. 5. In this case, the light incident from a light source 80 and specularly reflected from the object surface 82 advances in the reverse direction at an angle symmetric with respect to a normal vector 84. The specularly reflected light then reaches the imaging apparatuses 12b and 12c positioned in the direction of reflection. As a result, the imaging apparatuses 12b and 12c obtain images that capture the specular reflection.

On the other hand, in the case where there is no imaging apparatus in the advancing direction of the specular reflection, i.e., where the imaging apparatus 12a is positioned on the same side as the light source 80 in reference to the normal vector 84, the proportion of the captured light that is diffused by the object, i.e., diffusely reflected therefrom, is dominant. That is, when the imaging apparatus 12 is positioned on the same side as the light source 80 with respect to the normal vector 84, the image captured of the object directly illuminated by the light source 80 is formed by the light whose diffuse reflection component is dominant.

This kind of positional relationship between the imaging apparatus and the light source can occur in diverse situations, e.g., where the object is illuminated by a head-mounted display equipped with the imaging apparatus 12 in a darkened room, or where the object is lighted by the screen of the display apparatus 16 on which the imaging apparatus 12 is placed. It is to be noted that what FIG. 5 illustrates is the microscopic principle. Macroscopically, when the light source 80 as viewed from the object is positioned in a predetermined angular range e relative to the imaging apparatus 12, or when the light source 80 is positioned within a predetermined distance from the imaging apparatus 12a, the diffuse reflection becomes dominant in many regions of the image captured of the object under direct illumination of the light source 80. In other words, because the reflection components can be controlled using the light source positioned close to the imaging apparatus 12, the normal line information is obtained with higher accuracy than if the image is captured under general illumination of which the ratio of specular reflection and diffuse reflection is unknown. In the description that follows, the illumination by the light source meeting the above conditions will be referred to as "front illumination."

Figure 6:
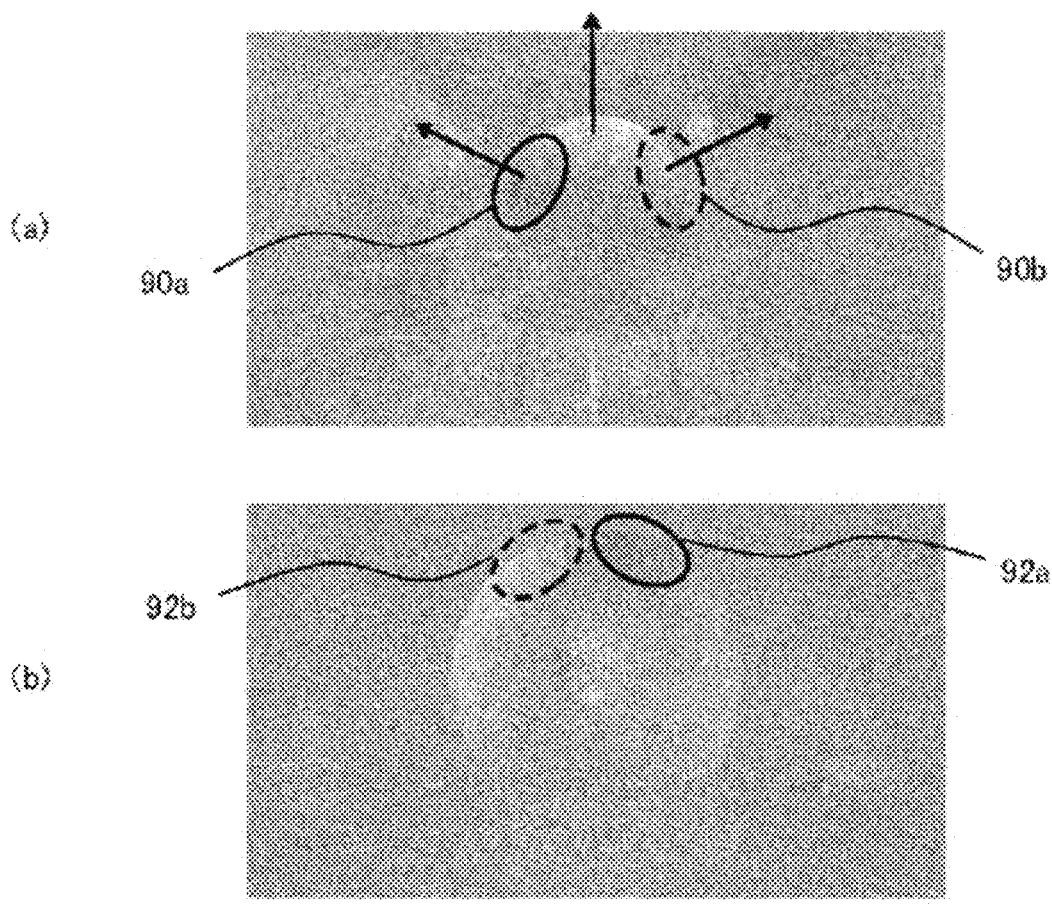
FIG. 6 is a schematic diagram comparing a normal line distribution between under ceiling illumination and front illumination, the distribution being acquired by applying the specular reflection model to an entire image.

FIG. 6 compares a normal line distribution between under ceiling illumination and front illumination, the distribution being acquired by applying the specular reflection model to the entire image. The drawing further indicates, on the gray scale, normal line images representing the three components of the normal vector defined by the mathematical expression 4 above, the three components being expressed in three elements (R, G, B). In the case of ceiling illumination depicted in Subfigure (a), the specularly reflected light from the upper half surface of a spherical object reaches the imaging apparatus 12. Thus, applying the specular reflection model to the image makes it possible to obtain accurate normal vectors indicated by arrows.

The colors of the normal line image are determined by the three elements of the normal vector. For this reason, in the case of front illumination depicted in Subfigure (b), the spherical object should normally be expressed by a color distribution similar to that in Subfigure (a). However, the color distribution of the spherical object in the normal line image of Subfigure (b) differs significantly from that in Subfigure (a). For example, the color appearing at the position of a solid-line ellipse 90a in the normal line image of Subfigure (a) appears at the position of a solid-line ellipse 92a in the normal line image of Subfigure (b).

The color appearing at the position of a broken-line ellipse 90b in the normal line image of Subfigure (a) appears at the position of a broken-line ellipse 92b in the normal line image of Subfigure (b). This kind of error stems from the fact that, as discussed above, the light from the side of the imaging apparatus 12 directly hits the spherical surface and is specularly reflected therefrom, the reflected light advancing in the reverse direction of the imaging apparatus 12 in many regions of the spherical surface. In such a case, the diffuse reflection model instead of the specular reflection model is applied to the spherical image region, which improves the accuracy of the normal line information.

Figure 7:
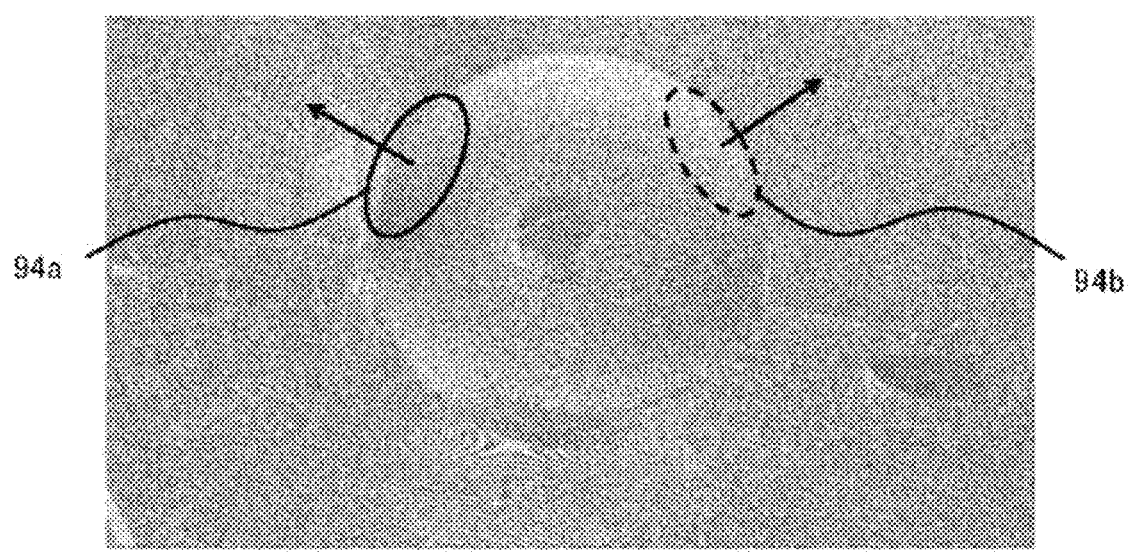
FIG. 7 is a schematic diagram depicting a normal line image in the case where the diffuse reflection model is applied to a polarized image used in Subfigure (b) of FIG. 6.

FIG. 7 depicts a normal line image given where the diffuse reflection model is applied to the polarized image used in Subfigure (b) of FIG. 6. Applying the diffuse reflection model makes it possible to obtain the normal vector of the spherical surface under direct front illumination in a manner similar to the case of ceiling illumination depicted in Subfigure (a) of FIG. 6. For example, the color appearing in the solid-line ellipse 90a in the normal line image of Subfigure (a) in FIG. 6 appears also at the same position in the normal line image of FIG. 7 (in a solid-line ellipse 94*a*). The color appearing in the broken-line ellipse 90*b* in the normal line image of Subfigure (a) in FIG. 6 appears also at the same position in the normal line image of FIG. 7 (in a broken-line ellipse 94*b*).

FIG. 8 depicts an azimuth image corresponding to the normal line image in FIG. 7. The azimuth image is an image in which the azimuth angles of normal lines are expressed in terms of pixel values. As indicated in the bottom right of FIG. 8, the gray scale is such that the smaller the angle $\theta$ between a normal line and the axis in a positive right direction ($0 \leq \theta < 180°$), the lower the luminance. For example, a look at the upper half of the spherical object reveals that the closer the position is to the right edge, the darker the object appears, and that the closer the position is to the left edge, the lighter the object appears. This indicates that the azimuth angles are accurately obtained.

The foregoing description focused on the spherical object under direct illumination of the light source on the side of the imaging apparatus 12. Meanwhile, the target space obviously includes not only the image formed by direct illumination from the light source but also images formed by reflected light from other objects as well as imaged objects formed by reflected light from other light sources. The normal lines of these objects are more likely to be obtained with higher accuracy through application of the specular reflection model permitting higher intensity as discussed above.

Figure 9:
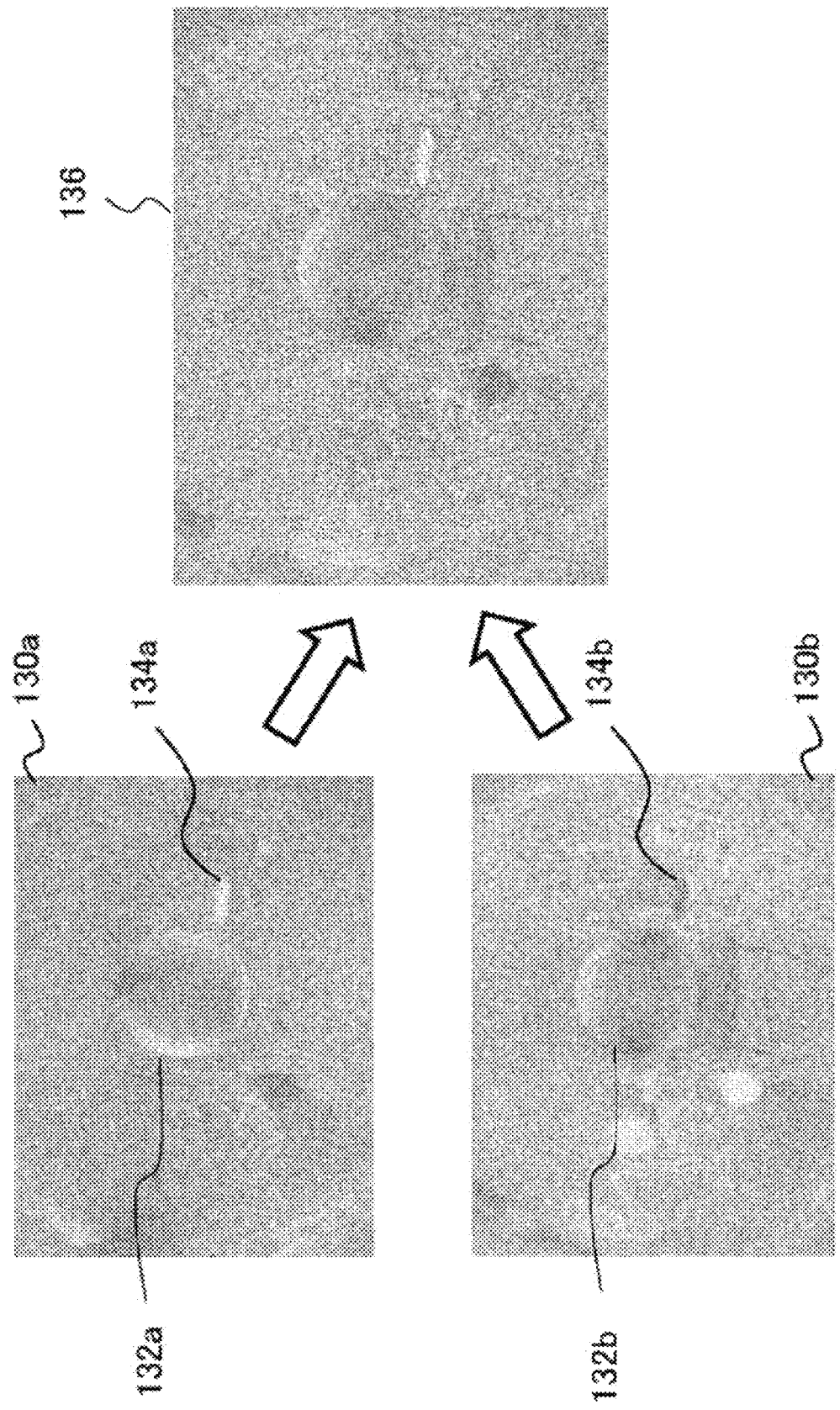
FIG. 9 is a schematic diagram explaining the effects of switching between the applied models according to the present embodiment.

FIG. 9 is a schematic diagram explaining the effects of switching the applied models depending on the region. Images 130*a* and 130*b* on the left in FIG. 9 are normal line images obtained by applying, respectively, the specular reflection model and the diffuse reflection model to a polarized image in a target space that includes a spherical object under front illumination. As explained above with reference to FIGS. 6 to 8, given spherical objects 132*a* and 132*b* under front illumination, more accurate normal line information is obtained regarding the image 130*b* to which the diffuse reflection model is applied.

Meanwhile, with respect to upper surfaces 134*a* and 134*b* of chairs near the spherical objects, the normal line information is more accurate regarding the image 130*a* from which an upward normal vector is obtained and to which the specular reflection model is applied. This is also confirmed, in the image 130*b*, by the similarity of color to the upper surface of the spherical object 132*b* from which an upward normal vector is also obtained. That is, a comparison of colors between the upper surfaces 134*a* and 134*b* of the chairs in the images 130*a* and 130*b* reveals that the color on the upper surface 134*a* of the chair appearing upon application of the specular reflection model is closer to the color on the upper surface of the spherical object 132*b*.

There are many cases where highly accurate normal line information is obtained regarding not only the upper surface of the chair but also other objects through application of the specular reflection model based on the above-mentioned principle. Thus, the region division section 58 in this example divides the image plane into the spherical image region and the remaining region, and assigns the diffuse reflection model to the spherical image region and the specular reflection model to the remaining region. The normal line calculation section 60 calculates a normal line distribution through application of the respective models as illustrated in the drawing.

Whereas FIG. 9 depicts the normal lines of both models as a normal line distribution over the entire image, only the region assigned to each model needs to be processed in practice. The integration section 62 integrates the normal line distributions obtained from the respective regions to generate a normal line image 136 as the final result. In this manner, highly accurate normal line information is obtained regarding not only the spherical object under front illumination but also the entire field of view.

Figure 10:
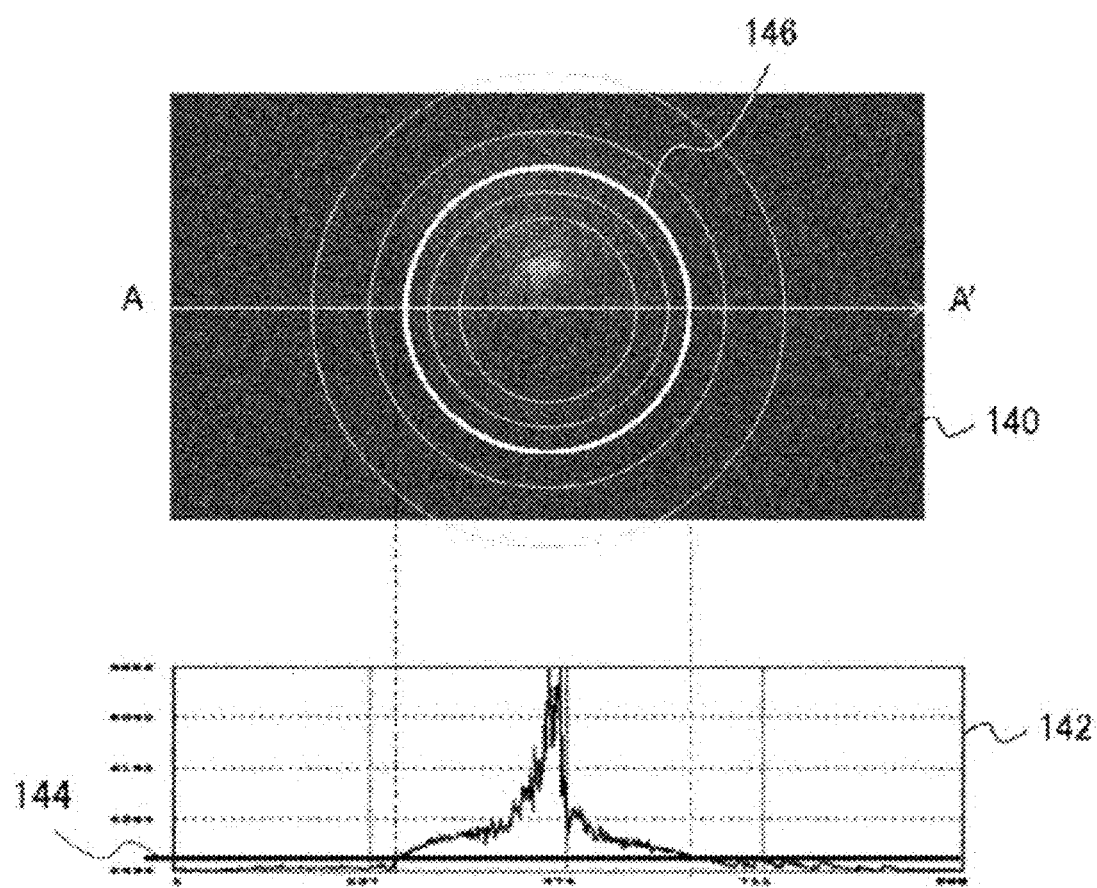
FIG. 10 is a schematic diagram explaining the case where luminance is used as a criterion for region division by the present embodiment.

Explained next are the criteria used by the region division section 58 for region division. FIG. 10 is a schematic diagram explaining the case where luminance is used as a criterion for region division. As in the foregoing cases, an image 140 in the upper part of FIG. 10 is a luminance image captured of a target space that includes a spherical object under front illumination. With this embodiment that acquires polarized images in four directions at intervals of 45° as described above, the pixel values of the luminance image are obtained by averaging the values of the corresponding pixels in the four polarized images. However, if a color image or a luminance image is separately obtained by the imaging apparatus, that image may be used instead.

A graph 142 in the lower part of FIG. 10 indicates a luminance distribution along a line AA' in the image 140. In the case where the spherical object is at the center of the field of view and where the central portion is under front illumination, the luminance peaks at that portion and remains relatively high within the range of the spherical object image. The luminance becomes lower in the surroundings such as in the background than in the spherical object image. The difference in luminance between the object directly under front illumination and the remaining objects is observed more prominently the higher the intensity of the front illumination compared with other indoor light sources and ambient light. Thus, a threshold value 144 is set with respect to the luminance. The range of the image in which the obtained luminance is higher than the threshold value 144 is considered the region of the object image under direct front illumination, and the diffuse reflection model is applied to that region.

For example, the region division section 58 repeatedly carries out threshold-based discrimination of the luminance image 140 successively from the top line down, thereby dividing the pixels into two groups by discriminating whether or not the luminance is larger than the threshold value. This makes it possible to extract, from the image plane, a spherical region 146 to which the diffuse reflection model is to be applied. The threshold value to be set may be either obtained experimentally beforehand as a value by which highly accurate normal line information is expected to be acquired, or acquired for each frame of the captured image on the basis of the histogram of luminance in an actual luminance image for example.

Figure 11:
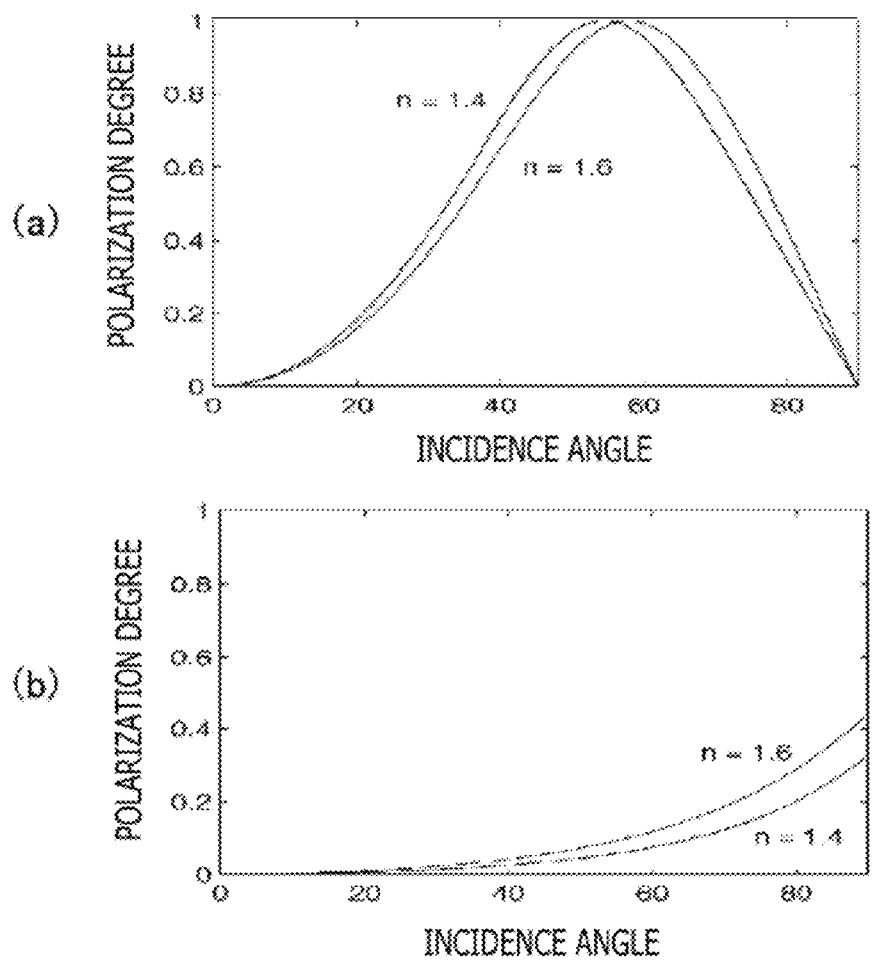
FIG. 11 is a schematic diagram comparing changes in polarization degree with respect to incidence angle between specular reflection and diffuse reflection.

Another typical criterion for region division is polarization degree. FIG. 11 compares changes in polarization degree with respect to incidence angle between specular reflection and diffuse reflection. The refractive index n of the object is assumed to be 1.4 and 1.6. Compared with the case of diffuse reflection depicted in Subfigure (b), the case of specular reflection in Subfigure (a) reveals significantly high polarization degrees in almost all the range of incidence angles. Given this characteristic, the reflected light from the object under direct front illumination such as the above-mentioned spherical object is thought to have low polarization degrees due to the dominant diffuse reflection component.

Figure 12:
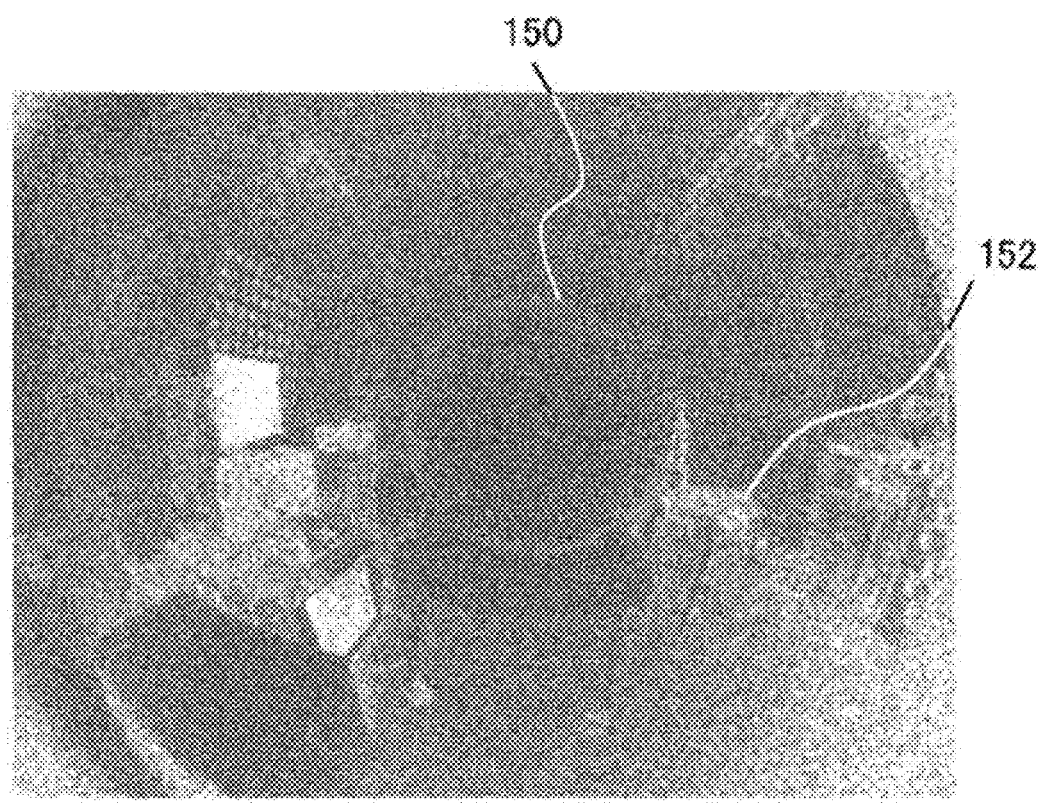
FIG. 12 is a schematic diagram illustrating a polarization angle image acquired by the present embodiment.

FIG. 12 illustrates an actual polarization degree image. The polarization degree image is an image that represents in pixel values the polarization degrees calculated from polarized images as discussed above. In the illustrated example, the lower the polarization degree, the lower the luminance on the gray scale. A spherical object 150 under front illumination as described above is seen having lower polarization degrees than a chair top surface 152 or the floor.

Figure 13:
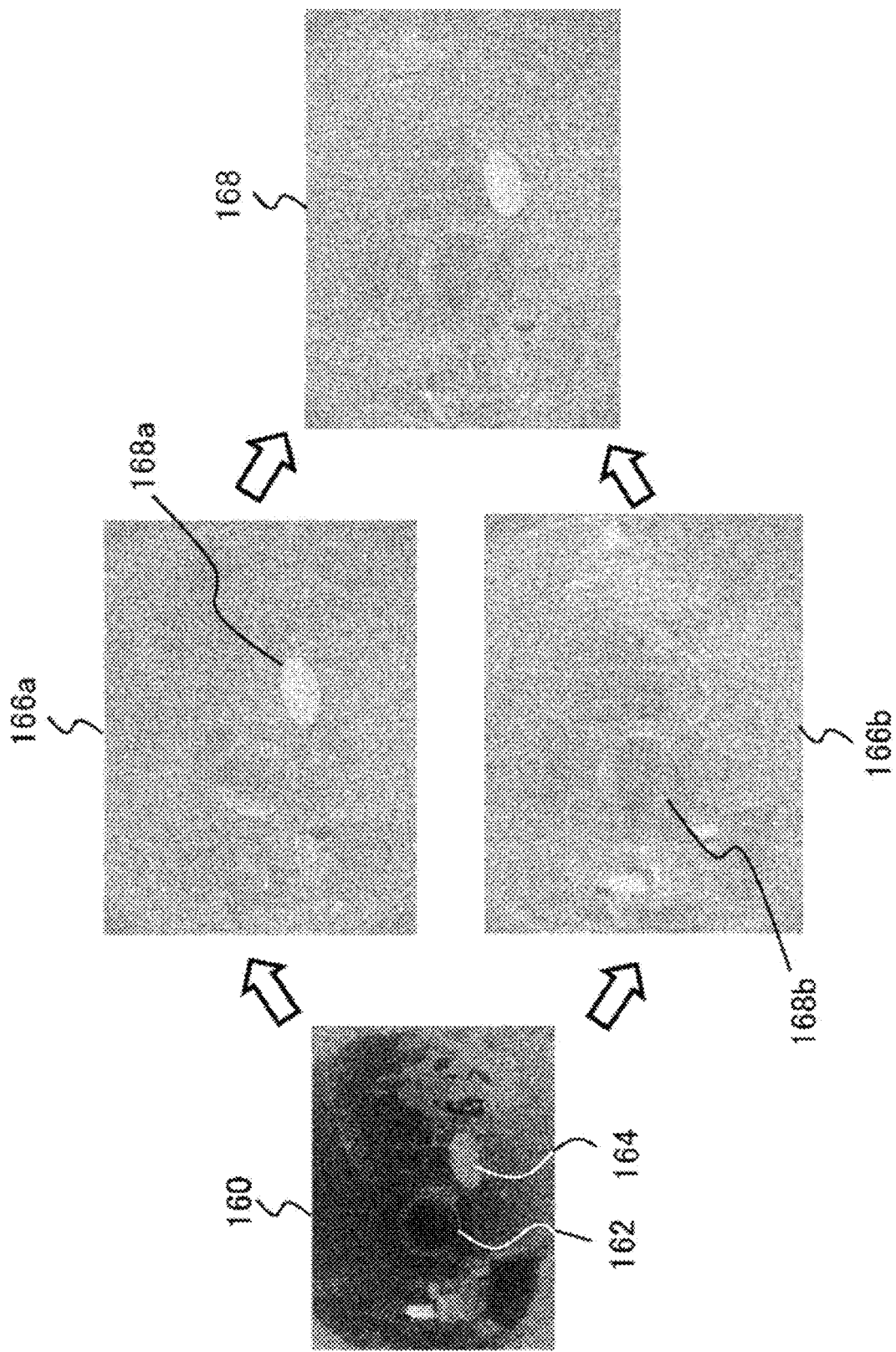
FIG. 13 is a schematic diagram illustrating how normal line information is obtained by the present embodiment through region division based on polarization degrees.

FIG. 13 illustrates how normal line information is obtained through region division based on polarization degrees. The region division section 58 acquires a polarization degree image 160 and divides an image plane the image into regions based on whether or not each pixel value exceeds a predetermined threshold value. For example, as with the polarization degree image indicated in FIG. 12, the polarization degree image 160 has, in terms of luminance values, low polarization degrees on the spherical object at the center and high polarization degrees on the chair top surface. The remaining regions are divided also according to the same criterion.

Then the normal line calculation section 60 obtains a distribution of normal vectors of the region with high polarization degrees using the specular reflection model and a distribution of normal vectors of the region with low polarization degrees using the diffuse reflection model. In FIG. 13, the former distribution of normal vectors is depicted as a normal line image 166a and the latter distribution of normal vectors as a normal line image 166b. As in the case of FIG. 9, it is to be noted, the normal line calculation section 60 need only calculate the normal lines of the region assigned to each model. This makes it possible to obtain accurate normal lines of a chair top surface 168a in the normal line image 166a and accurate normal lines of a spherical object 168b in the normal line image 166b.

Next, the integration section 62 integrates the two normal line images to generate a final normal line image 168. In this manner, as in the case of the normal line image 136 in FIG. 9, highly accurate normal line information is obtained regarding the entire image plane. Evaluations under diverse conditions confirmed that highly accurate normal line information was obtained over the entire image as in the case of FIG. 13. For example, if the imaged object includes an object made of a material liable to diffuse light such as a human hand (called the diffuser hereunder), the region to which to apply the diffuse reflection model is determined according to similar criteria regardless of where the light source is positioned. This permits acquisition of accurate normal line information.

FIG. 14 illustrates various images given when a diffuser exits in a target space. An image 170 on the left in FIG. 14 is a normal line image generated by applying the specular reflection model to the entire image. The normal vector of a sphere 172a and that of a hand 172b as a diffuser in the image 170 are different from the proper normal vectors in that, for example, those vectors are differently oriented on the top surface on which they should be oriented upward. Thus, a polarization degree image such as an image 174 on the right in FIG. 14 is obtained. This image is divided into regions for which the model to be applied thereto is switched as needed.

Figure 15:
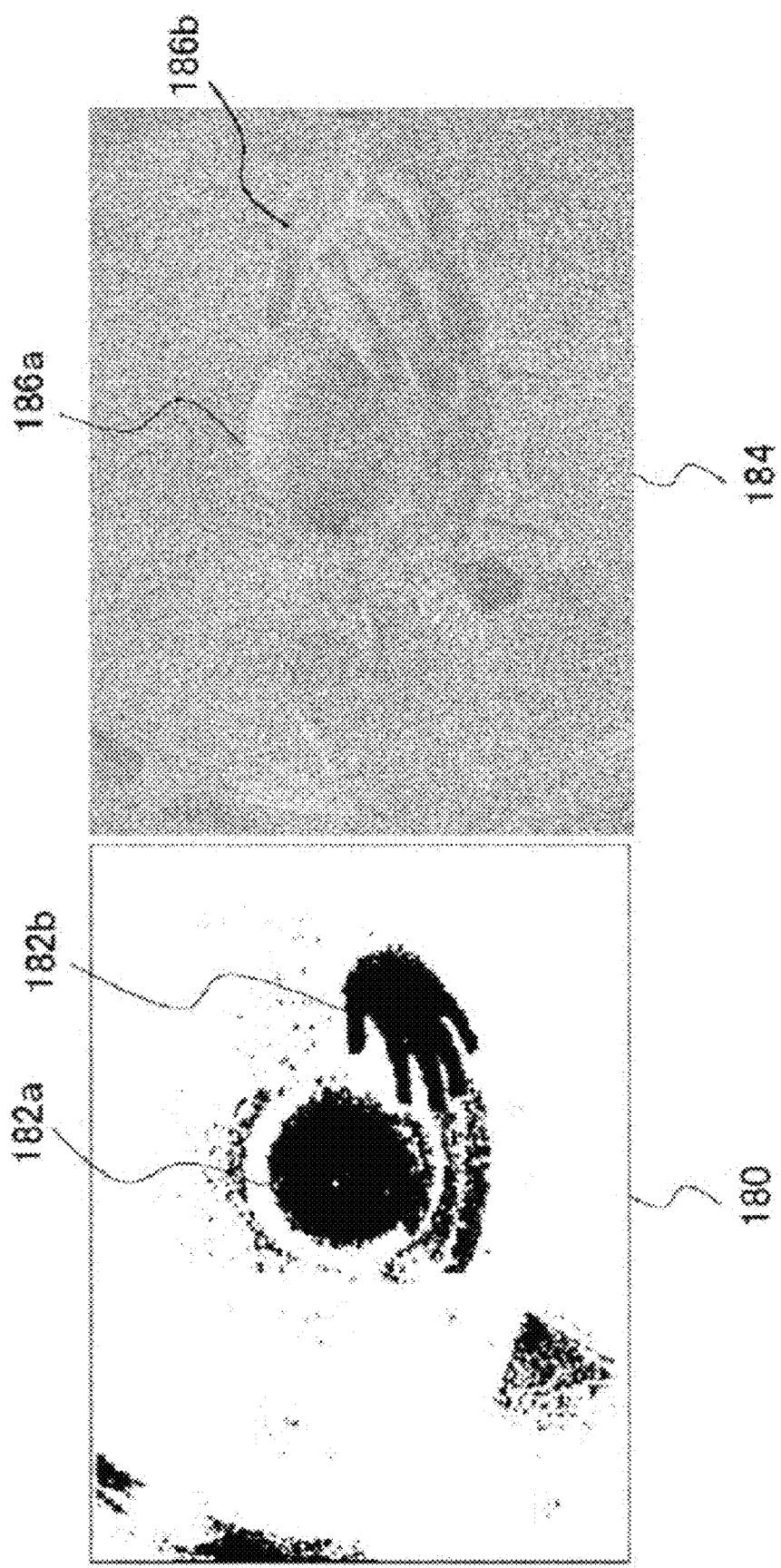
FIG. 15 is a schematic diagram depicting the result of region division based on polarization degrees as well as a normal line image obtained by switching the models applied to each of the regions involved according to the present embodiment.

In the image 174, both a sphere 176a and a hand 176b have low polarization degrees. These regions are extracted through discrimination based on a polarization degree threshold value. The diffuse reflection model is then applied to the extracted regions. FIG. 15 depicts the result of region division based on polarization degrees, as well as a normal line image obtained by switching the model applied to each of the regions involved. A region division image 180 is represented by a black region in which the polarization degrees are equal to or lower than the threshold value and by a white region in which the polarization degrees exceed the threshold value. As illustrated, a spherical object 182a under front illumination and a hand 182b as a diffuser are extracted as the region of low polarization degrees and distinguished from the remaining region.

The diffuse reflection model is then applied to the region of low polarization degrees so as to obtain normal lines. The result of the low polarization degree region and that of the remaining region to which the specular reflection model is applied are integrated to acquire a final normal line image 184. As illustrated, the normal line image 184 is compared with the image 170 in FIG. 14 so that the normal line information regarding a spherical object 186a and a hand 186b, for example, is corrected accordingly. The normal line information regarding the entire image is thus improved in accuracy. Whereas the hand is indicated as a typical diffuser in the drawings, similar advantageous effects are also obtained with respect to diverse diffusers such as the human skin and marble stone.

As can be seen from the image of the hand 182b being accurately obtained in the region division image 180, the region division based on polarization degrees can be used to accurately extract diffuser images regardless of purpose. This makes it possible to track the motions of the human limbs such as the hands in order to advance accordingly the information processing such as an electronic game, and to improve the accuracy of the process of expressing a virtual object interacting with the human hand. Also, a controller furnished with cloth or a matte material that gives little specular reflection may be used to perform the information processing accurately in response to the motion of the controller. In this case, the output data generation section 56 may directly acquire the result of region division from the region division section 58 and suitably carry out the information processing using the acquired result.

Figure 16:
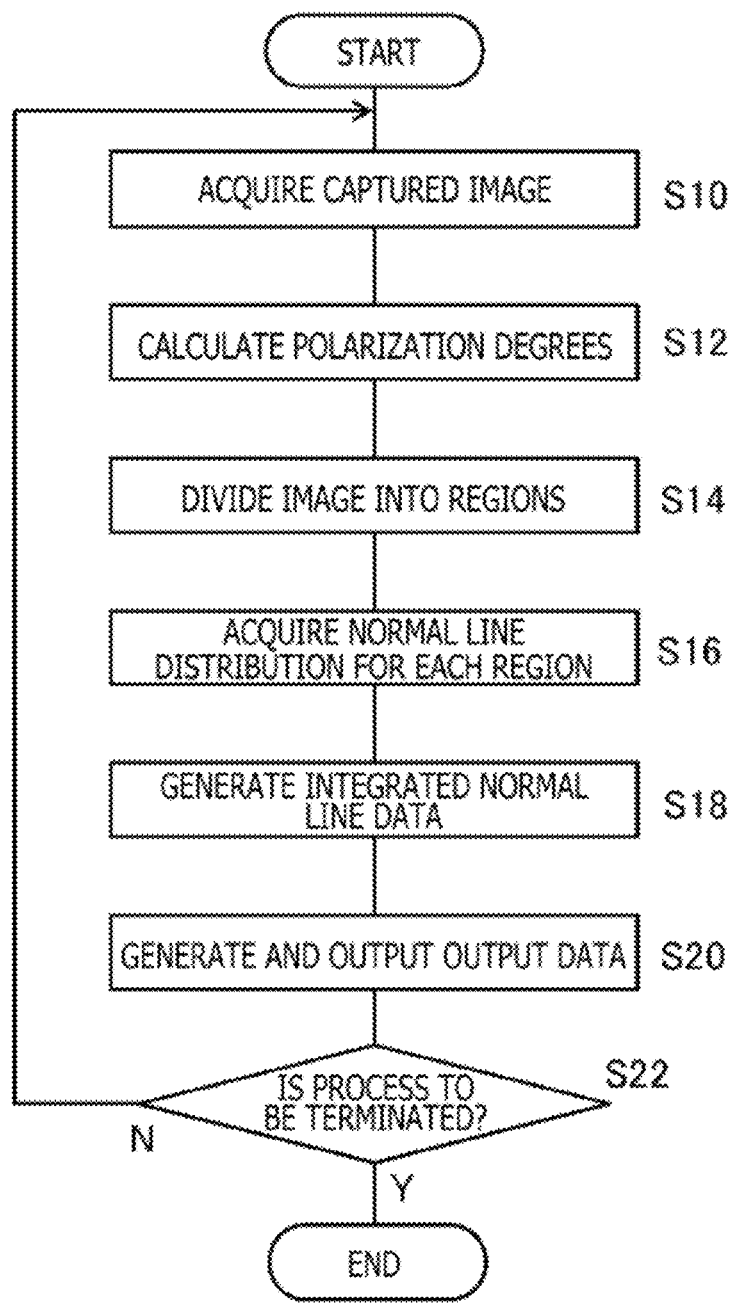
FIG. 16 is a flowchart depicting the steps performed by the information processing apparatus according to the present embodiment in order to acquire normal line information regarding an object using a polarized image, to generate output data, and to output the generated data.

Explained next is the operation of the information processing apparatus implemented in the configuration discussed above. FIG. 16 is a flowchart depicting the steps performed by the information processing apparatus 10 according to the present embodiment in order to acquire normal line information regarding an object using polarized images, generate output data, and output the generated data. The process of the flowchart is started when the user requests starting of the process by the information processing apparatus 10, the imaging apparatus 12 in turn starting to image the object in response to the request.

First, the captured image acquisition section 50 acquires captured image data from the imaging apparatus 12 (S10). The data may include natural light image data in addition to the polarized image data corresponding to multiple principal axis angles. The natural light images may be stereoscopic images taken by a stereo camera from right and left viewpoints. Alternatively, at least either of the stereoscopic images may be a polarized image. Either the imaging apparatus 12 or the information processing apparatus 10 may generate a natural light image by operating on multiple polarized images.

Next, the region division section 58 in the normal line information acquisition section 54 calculates polarization degrees for the entire image using the mathematical expression 2 above (S12). The polarization degrees may be calculated in units of pixels or in larger units. The region division section 58 divides pixels into two groups by discriminating whether or not the polarization degree of each pixel is equal to or lower than a predetermined threshold value (S14). As a result of this, a binary image is obtained that includes two regions such as the region division image 180 in FIG. 15. The region division section 58 assigns the diffuse reflection model to the region in which the polarization degrees are equal to or lower than the threshold value and the specular reflection model to the remaining region. It is to be noted, however, that luminance may be used instead as the criterion for region division as mentioned above.

The embodiment of this invention divides the image into regions in terms of whether or not the manner in which the object is illuminated is the same or whether or not the material of the object is the same. That is, the divided regions are equivalent in size to the image of the object. In view of this fact, a low-pass filter may be used to reduce a high-frequency component of the polarized image before the threshold-based discrimination is carried out. This makes it possible to minimize the adverse effects such as noise and to divide the image appropriately into regions with appreciably high accuracy. A threshold value suitable for highly accurate region division may be obtained beforehand in experiments or may be determined in S14 on the basis of, for example, a polarization degree histogram.

Next, the normal line calculation section 60 applies the assigned model to each region and acquires a normal line distribution thereof (S16). The polarization degrees obtained in S12 are utilized here. Depending on the model to be applied, the normal vector distribution is obtained using the mathematical expressions 3 and 4 above, for example. The integration section 62 integrates the divided regions into the original image to generate the normal line data that integrates the normal vector distributions of the regions involved (S18).

The output data generation section 56 generates the output data such as display image data and audio data by advancing an ongoing game based on the normal line data or by rendering a virtual object in the captured image, for example. The output data generation section 56 outputs the generated data to the display apparatus 16 (S20). The processes executed here are not limited to anything specific as mentioned above. Processes in S16 and S18 may be omitted in the case where the image of the diffuser such as the hand is extracted through discrimination based on the polarization degree threshold value and the result of the extraction is directly used in the information processing.

During the period in which there is no need to stop the process in response to, for example, the user's operation ("N" in S22), processes S10 to S20 are repeated on subsequent image frames. This permits display of game screens reflecting the state of the object or display of the result of information processing in the form of a video. When the process needs to be stopped in response to, for example, the user's operation ("Y" in S22), the entire process is brought to an end.

According to the present embodiment discussed above, where the technique for obtaining normal lines of the object surface using polarized images is in use, the image plane is divided into regions according to a predetermined criterion, before the applicable model is switched from one region to another. For example, given that the range of polarization degrees of diffuse reflection is often different from and significantly smaller than that of specular reflection, the embodiment applies the diffuse reflection model to the region in which the polarization degrees are equal to or lower than a predetermined threshold value and the specular reflection model to the region in which the polarization degrees are higher than the threshold value. Alternatively, given that the reflected light from the object under direct front illumination has a large proportion of the diffuse reflection component, the embodiment applies the diffuse reflection model to the region in which luminance is higher than a predetermined threshold value and the specular reflection model to the remaining region.

As described above, it is possible easily to discriminate the region in which diffuse reflection is dominant due to diverse causes including the material of the object and the way the object is illuminated, and to obtain accurate normal lines of the region by applying the diffuse reflection model thereto. Since specular reflection is often higher in intensity than diffuse reflection, the embodiment applies the specular reflection model to the remaining region. This prevents the accuracy of the normal line information from dropping significantly even if the diffuse reflection component is included. As a result, the accuracy of the normal line information regarding the entire image is improved.

In the case of an object being lighted from the side of the imaging apparatus, the diffuse reflection from the object dominantly reaches the imaging apparatus regardless of the material of the object. In such a case, the diffusely reflecting region is extracted particularly by use of polarization degrees or luminance, with the diffuse reflection model applied to the region so as to obtain highly accurate normal line information regarding the region. In the case of diffusers made of materials inherently resistant to specular reflection such as the human skin or marble stone, diffuse reflection is dominant irrespective of where the light source is positioned. Thus, under the above principle, the region of the image is accurately extracted according to criteria such as the polarization degree being equal to or lower than the threshold value. The information regarding the extracted region is not only used as the target to which the diffuse reflection model is applied but also utilized in information processing and image rendering. As a result, highly accurate information regarding the imaged object is obtained by simple processes and is employed in diverse forms of information processing.

While the present invention has been described in conjunction with a specific embodiment given as an example, it should be understood by those skilled in the art that the above-described composing elements and various processes may be combined in diverse ways and that such combinations, variations and modifications also fall within the scope of this invention.

For example, the above embodiment was described in particular as capable of obtaining the accurate normal line information regarding the object under front illumination. By application of this characteristic, front illumination may be used so as to verify whether or not the state of the object is correctly recognized and to correct the recognized state as needed. That is, the state in which front illumination is not applied is assumed to be the normal state. The state of the object is then acquired using common techniques based on polarized or stereoscopic images. Next, the object is temporarily placed under front illumination at a predetermined timing so that the normal lines of the illuminated object may be calculated as described above by the embodiment, the calculated normal line information being compared with the state information obtained so far.

Given that the normal lines of the object under front illumination are more accurately obtained, differences between the state information obtained under front illumination and the previously acquired state information reveal that the latter information is erroneous. Then the previously obtained information can be corrected on the basis of the normal line information acquired under front illumination. The verification using the front illumination may be performed periodically at predetermined time intervals or may be carried out in a suitably timed manner such as at the time of starting a process, calibration, or upon switching of a game scene. As another alternative, when the state of the object becomes unstable with common techniques in use, the object may be placed under front illumination so that its state information may be reset.

In any case, the information processing apparatus includes an illumination control section, not depicted, configured to control turning-on/off and a luminous intensity of a lighting device for front illumination. In the case where the imaging apparatus 12 is to be furnished with the lighting device, the role of the illumination control section may be assumed by the captured image acquisition section 50 communicating with the imaging apparatus 12. Where the light from the screen of the display apparatus 16 is to be utilized, the role of the illumination control section may be assumed by the output data generation section 56 communicating with the display apparatus 16. The output data generation section 56 may control the display image in such a manner that the object is illuminated at a luminance level equal to or higher than a predetermined level.

During the period in which the lighting device is turned on or when its luminous intensity remains equal to or higher than a predetermined level, the information processing apparatus may acquire normal line information accurately using the technique discussed above in conjunction with the embodiment. After correcting the state information following comparison with what has been recognized in the normal state, the information processing apparatus may turn off the lighting device or may resume the normal luminous intensity as needed. Where front illumination is temporarily utilized as described above, the state of the object is correctly acquired continuously while the power required for illumination is being saved.

As another alternative, the information processing apparatus may, without controlling the light source, separately acquire information as to whether or not the object is actually under front illumination. The information processing apparatus may then implement the technique of the above embodiment during the period in which front illumination is in use. For example, the information processing apparatus may prompt the user to turn on the lighting device that is appropriately positioned. As a further alternative, it may be discriminated that the object is under direct illumination when the peak of the luminance in the luminance image such as one in FIG. 10 is equal to or higher than a predetermined level.

REFERENCE SIGNS LIST

10 Information processing apparatus, 12 Imaging apparatus, 16 Display apparatus, 23 CPU, 24 GPU, 26 Main memory, 50 Captured image acquisition section, 52 Image data storage section, 54 Normal line information acquisition section, 56 Output data generation section, 58 Region division section, 60 Normal line calculation section, 62 Integration section.

INDUSTRIAL APPLICABILITY

The present invention, as described above, may be applied to diverse types of information processing apparatuses such as game devices, mobile terminals, and personal computers, as well systems that include the information processing apparatus.

The invention claimed is:

1. An information processing apparatus acquiring information regarding a normal line of a surface of an object from a polarized image thereof for information processing, the information processing apparatus comprising:
    a region division section configured to divide an image plane into a plurality of regions so as to assign either a specular reflection model or a diffuse reflection model to each of the regions;
    a normal line calculation section configured to obtain a distribution of normal lines of each of the regions divided of the polarized image through application of the assigned model; and
    an integration section configured to integrate the distributions of normal lines of the regions so as to generate and output a normal line distribution of the entire image plane,
    wherein the region division section assigns the diffuse reflection model to all regions of the plurality of regions in which luminance is higher than a threshold value in a luminance image corresponding to the polarized image and the specular reflection model to all remaining region of the plurality of regions having luminance lower than the threshold value.

2. The information processing apparatus according to claim 1, wherein the region division section assigns the diffuse reflection model to a region in which a polarization degree obtained from the polarized image is equal to or lower than a threshold value and the specular reflection model to the remaining region.

3. The information processing apparatus according to claim 1, wherein the output data generation section performs information processing using the result of the region division carried out by the region division section.

4. The information processing apparatus according to claim 1, wherein the region division section, the normal line calculation section, and the integration section operate when a light source is positioned within a predetermined distance from an imaging apparatus configured to capture the polarized image,
    wherein, if an object is greater than a second predetermined distance from the light source, the diffuse reflection model is used for the object.

5. The information processing apparatus according to claim 1, further comprising:
    an illumination control section configured to control either turning-on/off or luminous intensity of a light source positioned within a predetermined distance from an imaging apparatus configured to capture the polarized image;
    wherein the region division section, the normal line calculation section, and the integration section operate during a period in which the light source is turned on or provides a luminous intensity level equal to or higher than a predetermined level.

6. A normal line information acquisition method by an information processing apparatus acquiring information regarding a normal line of a surface of an object from a polarized image thereof, the method comprising:
    dividing an image plane into a plurality of regions so as to assign either a specular reflection model or a diffuse reflection model to each of the regions;
    obtaining a distribution of normal lines of each of the regions divided of the polarized image through application of the assigned model;
    integrating the distributions of normal lines of the regions so as to generate and output a normal line distribution of the entire image plane;

performing information processing using the result of the region division carried out by the region division section; and assigning the diffuse reflection model to all regions of the plurality of regions in which luminance is higher than a threshold value in a luminance image corresponding to the polarized image and the specular reflection model to all remaining region of the plurality of regions having luminance lower than the threshold value.

7. A non-transitory computer readable medium having stored thereon a computer program for a computer acquiring information regarding a normal line of a surface of an object from a polarized image thereof, the computer program comprising:

by a region division section, dividing an image plane into a plurality of regions so as to assign either a specular reflection model or a diffuse reflection model to each of the regions;

by a normal line calculation section, obtaining a distribution of normal lines of each of the regions divided of the polarized image through application of the assigned model; and by an integration section, integrating the distributions of normal lines of the regions so as to generate and output a normal line distribution of the entire image plane, wherein the region division section assigns the diffuse reflection model to all regions of the plurality of regions in which luminance is higher than a threshold value in a luminance image corresponding to the polarized image and the specular reflection model to all remaining region of the plurality of regions having luminance lower than the threshold value.

* * * * *